United States Patent
Lotspiech

(10) Patent No.: US 6,952,477 B1
(45) Date of Patent: Oct. 4, 2005

(54) FAULT INTOLERANT CIPHER CHAINING

(75) Inventor: Jeffrey Bruce Lotspiech, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 09/609,809

(22) Filed: Jul. 3, 2000

(51) Int. Cl.[7] .......................... H04K 1/00; H04L 9/28; H04L 9/18
(52) U.S. Cl. ...................... 380/37; 380/25; 380/28; 380/210; 713/193; 713/194
(58) Field of Search .................. 710/24; 714/6; 380/210, 25, 28, 37; 713/193

(56) References Cited

U.S. PATENT DOCUMENTS

| | | | | |
|---|---|---|---|---|
| 4,074,066 A | * | 2/1978 | Ehrsam et al. | 713/181 |
| 4,694,491 A | | 9/1987 | Horne et al. | 380/20 |
| 5,345,505 A | | 9/1994 | Pires | 380/20 |
| 5,592,552 A | | 1/1997 | Fiat | 380/21 |
| 5,940,513 A | * | 8/1999 | Aucsmith et al. | 713/187 |
| 6,154,541 A | * | 11/2000 | Zhang | 380/28 |
| 6,185,679 B1 | * | 2/2001 | Coppersmith et al. | 713/150 |
| 6,259,789 B1 | * | 7/2001 | Paone | 380/28 |
| 6,333,983 B1 | * | 12/2001 | Enichen et al. | 380/273 |
| 6,345,101 B1 | * | 2/2002 | Shukla | 380/210 |
| 6,772,343 B1 | * | 8/2004 | Shimizu et al. | 713/193 |

OTHER PUBLICATIONS

FIPS PUB 81, Feb. 12, 1980, DES Modes of Operation, "www.itl.nist.gov/fipspubs/fip81.htm" pp. 1-23.*

* cited by examiner

Primary Examiner—Ayaz Sheikh
Assistant Examiner—Carl G Colin
(74) Attorney, Agent, or Firm—John L. Rogitz

(57) ABSTRACT

A method and system for producing, e.g., tamper-resistant software such that the software is fault intolerant, thereby complicating hacking attacks, includes undertaking several iterations of forward plain text chaining and backward plain text chaining through the blocks. Essentially, during forward chaining a block is scrambles using a single round of an appropriate algorithm such as DES, and then it is XORed with the plain text of the next block. The result of the XOR is then scrambled, and then XORed with the plain text of the next block, and so on. At the end of the stream, the process is repeated in reverse, from last block to first. The cycles are repeated for the desired number of rounds, e.g., 16.

10 Claims, 1 Drawing Sheet

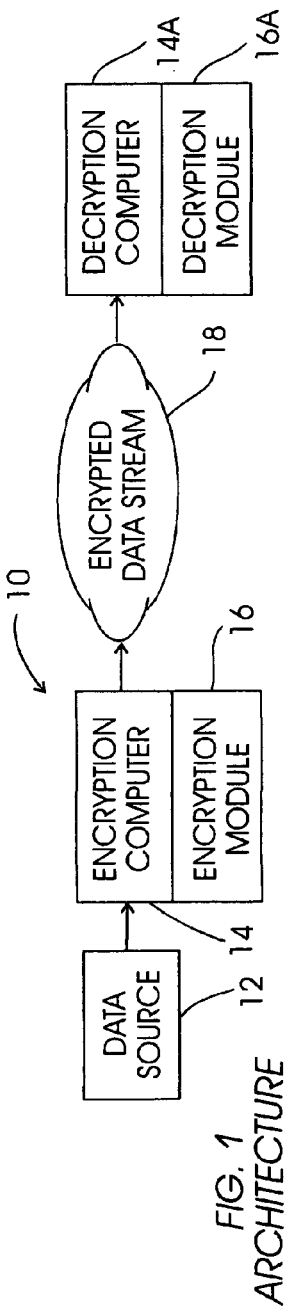
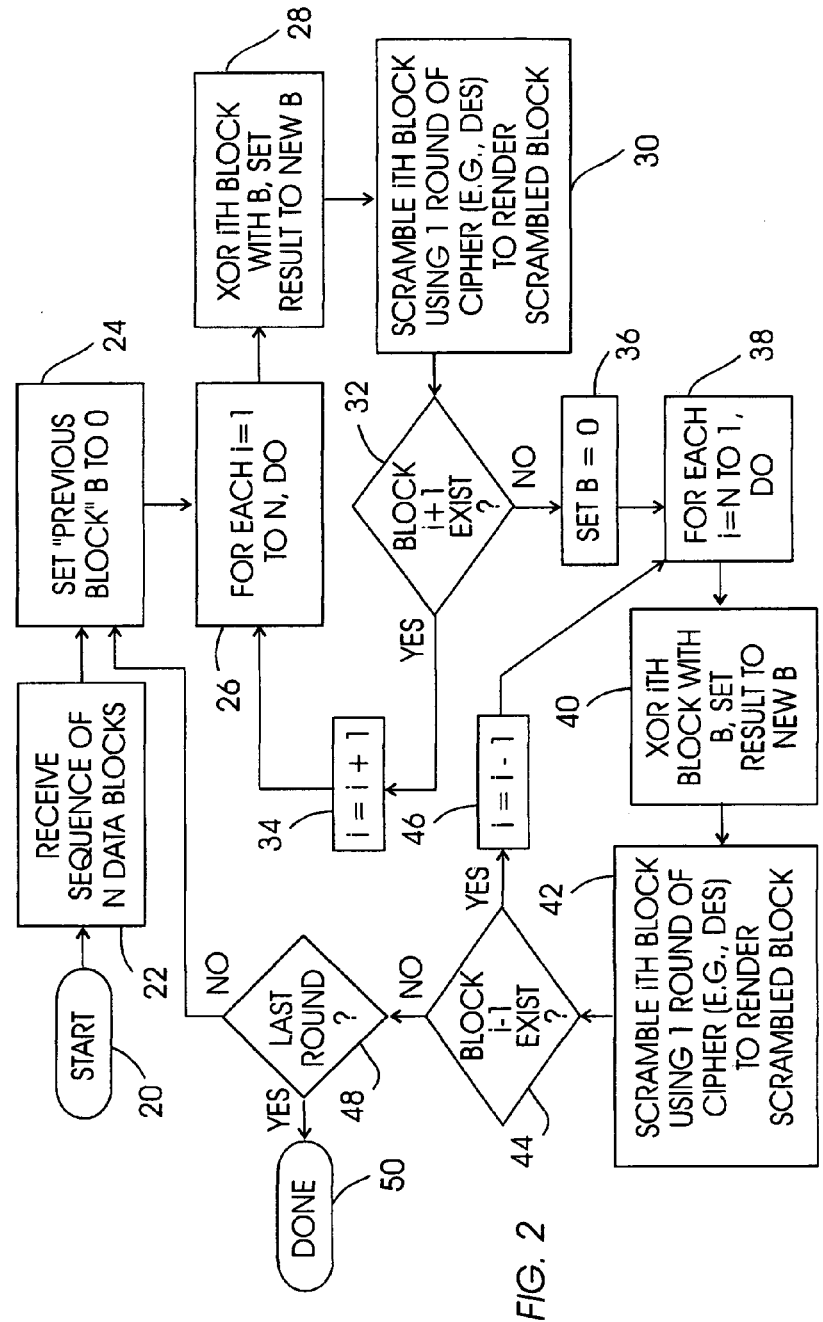
FIG. 1
ARCHITECTURE
FIG. 2

FAULT INTOLERANT CIPHER CHAINING

BACKGROUND OF THE INVENTION

1. Field of the Invention

The present invention relates generally to encrypting data for rendering tamper resistance software such that the encrypted data is intolerant of faults, thereby complicating hacking the software.

2. Description of the Related Art

The field of tamper resistant software is rapidly growing. Tamper resistant software is protected by encrypting the software, with the software (or the necessary parts) being decrypted only when the software (or parts) is required to perform a desired secret function.

In considering the ways in which tamper resistant software can be encrypted, the present invention recognizes that in most cryptographic applications, it is desirable that the cipher used to encrypt data is fault tolerant, so that, for example, a transmission error that might destroy part of the encrypted message will not destroy the remainder of the message. The present invention further recognizes that in the context of tamper resistant software, however, fault tolerance can be disastrous. This is because, as understood herein, fault tolerance enables a hacker to arbitrarily change one of the blocks in the encrypted software, hoping to cause a fatal, immediate system error so that the program crashes. A debugger will then be invoked to handle the crash. When the debugger is invoked on the crashed program, most of the program, because of fault tolerance, will remain unaffected by the meddling, and can be available in the clear for the hacker to discover. The present invention understands that such an attack would not require an unduly large number of meddlings before the desired crash and subsequent exposure of the software occurs.

The present invention, in recognizing the above-discussed problem, offers the solution or solutions herein.

SUMMARY OF THE INVENTION

The invention includes a computer system for undertaking the inventive logic set forth herein. The invention can also be embodied in a computer program product that stores the present logic and that can be accessed by a processor to execute the logic. Also, the invention is a computer-implemented method that follows the logic disclosed below.

A method for is disclosed for generating a tamper resistant version of a software program including a stream of data blocks. The method includes undertaking a predetermined number of iterations of forward plain text chaining of the blocks followed by backward plain text chaining of the blocks.

In a preferred embodiment, the method includes scrambling chained blocks using a cipher. A block is first XORed with its adjacent block, then scrambled using only a single round of the cipher to render a scrambled block. However, the value of the block before it was scrambled is remembered, and used to XOR with the next adjacent block before it itself is scrambled with a single round.

In another aspect, a computer program device includes a computer program storage device that in turn includes a program of instructions which are usable by an encryption computer. The program includes logic means for scrambling a data block in a stream of data blocks using a first round of a cipher to render a scrambled block. Logic means chain the scrambled block to a plain text version of an adjacent block in the stream to render a chained block. Then, logic means scramble the chained block to render a result, and logic means iterate the means for scrambling and chaining using subsequent rounds of the cipher.

In still another aspect, a computer system is disclosed for encrypting a stream of data blocks. The system includes a processor programmed to execute method acts. The method acts executed by the processor include receiving a sequence of N blocks, and then, for i=1 to N, executing a DO loop in a forward chaining process.

The forward chaining DO loop includes an XOR step, where an $i^{th}$ block is XORed with the result of the XOR step on block i-1. The XOR step is followed by a scrambling step, in which one round of a cipher is performed to scramble the result of the XOR. The scrambling step is followed by a determination of whether block i+1 exists. If it does, the output of the XOR step of block i is XORed with block i+1, i is incremented by unity, and the chaining process continues.

In contrast, when it is determined that a $block_{i+1}$ does not exist, the method acts executed by the processor executing a DO loop for i=N to 1 in a backward chaining process. The backward chaining process includes an XOR step, where an $i^{th}$ block is XORed with the result of the XOR step from block i=1. The XOR step is followed by a scrambling step, in which one round of a cipher is performed to scramble the result of the XOR. The scrambling step is followed by a determination whether block i-1 exists. If it does, the output of the XOR step of block i is XORed with block i-1, i is decremented by unity, and the chaining process continues. Otherwise, it is determined whether a predetermined number of iterations have been executed, and if not, another forward chaining loop is executed using a next round of the cipher. When all cipher rounds have been used, an encrypted stream of data blocks is output.

In yet another aspect, a method is disclosed for generating a tamper resistant version of a software program that includes a stream of data blocks. The method includes providing a cipher defining rounds, and iterating through the rounds of the cipher by iterating through respective outer loops of forward plain text chaining followed by backward plain text chaining. During each forward portion of an outer loop, a respective round of the cipher is applied to each block, and during each backward portion of an outer loop, a respective round of the cipher is applied to each block.

In another aspect, a method for generating a tamper resistant version of a software program including a stream of data blocks includes chaining the block to a another block to render a chained block. Next, the method includes scrambling the chained block using one and only round of the cipher.

In another aspect, a decrypting computer system is disclosed that undertakes the above method in reverse. Specifically, in one preferred embodiment the decrypting computer system receives a sequence of N blocks, and for i=N to 1, it executes a DO loop that includes reverse XORing an $i^{th}$ block with a $block_{i-1}$. The DO loop also includes unscrambling the $i^{th}$ block using a round of a cipher to render an unscrambled block, and then determining whether a $block_{i-1}$ exists. If it does, "i" is decremented by unity, and the next block is processed.

Otherwise, a forward decryption loop is entered, wherein the computer enters a DO loop for i=1 to N that includes reverse XORing an $i^{th}$ block with a $block_{i+1}$, and then unscrambling the $i^{th}$ block using a single round of a cipher to render an unscrambled block. The computer determines whether a $block_{i+1}$ exists, and if so, "i" is incremented by unity and the next block processed. Otherwise, it is determined whether a predetermined number of iterations have been executed, and if not, the next round of the cipher is used. When all cipher rounds have been used to decrypt the stream, a decrypted stream of data blocks is output.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present system; and
FIG. 2 is a flow chart of the encryption logic.

DETAILED DESCRIPTION OF THE PREFERRED EMBODIMENTS

Referring initially to FIG. 1, a system is shown, generally designated 10, for encrypting data and in particular for encrypting software from a data source 12, to render the software tamper-resistant. As shown, the system includes an encryption computer 14 that accesses an encryption module 16 which functions in accordance with the present disclosure to produce encrypted data 18 that is fault intolerant and tamper-resistant. The data 18 thus can be a tamper-resistant version of computer programs from the data source 12. A decryption computer 14a with decryption module 16a that essentially performs the logic of the encryption module 16 in reverse can then access the encrypted data 18 to decrypt it and use the program it embodies.

It is to be understood that the processor of the encryption computer 14 accesses the module 16 to undertake the logic shown and discussed below, which may be executed by a processor as a series of computer-executable instructions.

The instructions may be contained on a data storage device with a computer readable medium, such as a computer diskette having a computer usable medium with computer readable code elements stored thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function acts corresponding to those shown.

Referring now to FIG. 2, commencing at start state 20, the logic proceeds to state 22, wherein a sequence of N data blocks is received, wherein N is an integer and the data blocks can be, e.g., blocks of a computer program. Moving to state 24, the "previous block" value B is initialized. While it is convenient to initialize it to 0, it can be initialized to any constant value, and all such values are within the scope of this invention. It is even possible to use the initialization constant as another key for the encryption process.

Moving to state 26, a DO loop is entered for each i=1 to N in a forward plain text chaining iteration. Proceeding to state 28, the ith block is XORed with the value B. The result both changes the ith block, and becomes the new value B. Moving to state 30, the ith block is scrambled using one round of a cipher, such as but not limited to DES. Indeed, the present invention applies to other ciphers having rounds of scrambling. In the first iteration, the first round of the cipher is used. This is in contrast to conventional DES operation, wherein all 16 rounds of DES scrambling are performed on a single block, and only then is the block chained to another block, so as to render a fault tolerant design. –Moving to decision diamond 32, it is determined whether the ith+1 block exists, and if so, the logic continues to state 34. At state 34, the counter i is incremented by unity. The logic then loops back to state 26.

When the test at decision diamond 32 is negative, meaning that the stream of data blocks have been processed in a forward iteration, the logic proceeds to state 36, wherein the previous block value 13 is initialized. Moving to state 38, a DO loop is entered for each i=N to 1 in a backward plain text chaining iteration using the round of the cipher that follows the round used at state 30. Proceeding to state 40, the ith block is XORed with the value 13. The result both changes the ith block, and becomes the new value 13. Moving to state 42, the ith data block is scrambled using one round of a cipher. In the first iteration through the backward chaining process, the second round of the cipher is used.

Moving to decision diamond 44, it is determined whether the ith-1 block exists, and if so, the logic continues to state 46. At state 46, the counter "i" is decremented by unity. The logic then loops back to state 38.

When the test at decision diamond 44 is negative, indicating that the backward chaining iteration has been completed, the logic moves to decision diamond 48. At decision diamond 48, it is determined whether the last round of the cipher has been used. In the case of DES, 16 rounds are used. In accordance with the above disclosure, the odd numbers are used during forward chaining and the even rounds are used during backward chaining. It is to be understood that the roles of forward and backward chaining could be swapped. Likewise, it would be possible to, for example, have any constant number of cipher rounds instead of one at states 30 and 42. All such variations are within the scope of this invention.

If more rounds remain, the logic moves from decision diamond 48 to block 24, to undertake another forward plain text chaining iteration using the next round of the cipher. On the other hand, after all rounds of the cipher has been used, the logic moves from decision diamond 48 to output the encrypted, tamper resistant version of the software program received at state 22. The output is fault intolerant, so that the above-described hacker attack would result in scrambling the entire program beyond readability, instead of just a small portion of it.

The below pseudocode represents the above process, which can be referred to as "oxen plow encryption", along with the decryption process which is simply the reverse of the encryption process.

```
/* oxen plow encryption: */
for (i=0; i<ROUNDS; i +=2) {
   /* forwards */
   B=0;
   for (inout=buffer; inout<end;) {
      *inout++=encrypt (B^ (t =*inout++));
      B=t;
   }
   /* backwards: */
   B=0;
```

```
    for (inout=end; inout>=buffer;) {
        *--inout=encrypt (B⁶t=inout-[1]);
B=t
    }
}
/* oxen plow decryption: */
for (i=0; i<ROUNDS; i +=2) {
    /* backwards first! must undo encryption: */
    B=0
    for (inout=end; inout>=buffer;) {
    B=*--inout=B⁶ decrypt (inout[-1]);
    }
    B=0;
    for (inout=end; inout>=buffer; ) {
    B=*++inout =B⁶ decrypt (*inout++);
```

Although the XOR operation has been described to chain two blocks together, it is to be understood that XOR is not the only such function that could be used. For example, the encryption process could used ADD and the decryption process could use SUBTRACT, and this would achieve the same effect. The important property is that the any function chosen must have a suitable inversion function. XOR is convenient, because it is its own inversion function. However, all such functions are within the scope of this invention.

While the particular FAULT INTOLERANT CIPHER CHAINING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one", not "only one", unless otherwise stated in the claim. All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for" or, in the case of a method claim, the element is recited as a "step" instead of an "act".

I claim:

1. A computer program device, comprising:
    a computer readable medium including a program of instructions usable by an encryption computer, comprising:
        logic means for chaining a data block to a plain text version of an adjacent block in the stream to render a chained block;
        logic means for scrambling the chained block using a first round of a cipher to tender a scrambled block; and
        logic means for iterating the means for scrambling and chaining using subsequent rounds of the cipher.

2. The computer program device of claim 1, wherein the means for iterating iterates forward and backward through the stream, using successive rounds of the cipher.

3. A computer system for encrypting a stream of data blocks, comprising a processor programmed to execute method acts including:
    (a) receiving a sequence of N blocks;
    (b) initializing a previous block variable B;
    (c) for i=1 to N, executing a DO loop comprising:
        (c)(1) XORing an ith block with B to render a modified ith block;
        (c)(2) stating H equal to the modified ith block;
        (c)(3) scrambling the modified ith block using at least one round of a cipher;
        (c)(4) incrementing "i" by unity and returning to act (c)(1);
    (d) initializing a previous block variable B;
    (e) for i=N to 1, executing a DO loop comprising:
        (e)(1) XORing an ith block with B, yielding a modified ith block;
        (e)(2) setting B to the modified ith block;
        (e)(3) scrambling the modified ith block using at least one next round of a cipher;
        (e)(4) decrementing "i" by unity and returning to act (c)(1); and
    (f) determining whether a predetermined number of iterations have been executed, and if not, returning to act (c1) using a next round of the cipher, otherwise outputting an encrypted stream of data blocks.

4. The computer system of claim 3, wherein the stream of data blocks is established by a computer program.

5. The computer system of claim 4, wherein a respective round of the cipher is used for each iteration.

6. A method for generating a tamper resistant version of a software program including a stream of data blocks, comprising:
    providing a cipher defining rounds;
    iterating through the rounds of the cipher by iterating through respective outer loops of forward plain text chaining followed by backward plant text chaining; and
    during each forward portion of an outer loop, applying a respective round of the cipher to each block, and during each backward portion of an outer loop, applying a respective round of the cipher to each block.

7. The method of claim 6, further comprising:
    (a) receiving a sequence of N blocks;
    (b) initializing a previous block variable B;
    (c) for i=1 to N, executing a DO loop comprising:
        (c)(1) XORing an ith block with B to render a modified ith block;
        (c)(2) setting B equal to the modified ith block;
        (c)(3) scrambling the modified ith block using at least one round of a cipher;
        (c)(4) incrementing "i" by unity and returning to act (c)(1);
    (d) initializing a previous block variable B;
    (e) for i=N to 1, executing a DO loop comprising;
        (e)(1) XORing an ith block with B, yielding a modified ith block;
        (e)(2) setting B to the modified ith block;
        (e)(3) scrambling the modified ith block using at least one next round of a cipher;

(e)(4) decrementing "i" by unity and returning to act (c)(1); and (f) determining whether a predetermined number of iterations have been executed, and if not, returning to act (c1) using a next round of the cipher, otherwise outputting an encrypted stream of data blocks.

8. A computer system for decrypting a stream of data blocks, comprising a processor programmed to execute method acts including:

(a) receiving a sequence of N blocks;

(b) for i=N to 1, executing a DO loop comprising:
- (b)(1) reverse XORing an $i^{th}$ block with a block$_{i-1}$;
- (b)(2) unscrambling the $i^{th}$ block using a round of a cipher to render an unscrambled block;
- (b)(3) determining whether a block$_{i-1}$ exists, and if not, proceeding to act (c), otherwise;
- (b)(4) decrementing "i" by unity and returning to act (b)(1);

(c) for i=1 to N, executing a DO loop comprising;
- (e)(1) reverse XORing an is block with a block$_{i+j}$;
- (c)(2) unscrambling the $i^{th}$ block using a single round of a cipher to render an unscrambled block:
- (c)(3) determining whether a block$_{i+1}$ exists, and if not, proceeding to act (d), otherwise;
- (c)(4) incrementing "i" by unity and returning to act (c)(1);

(d) determining whether a predetermined number of iterations have been executed, and if not, returning to act (b) using a next round of the cipher, otherwise outputting a decrypted stream of data blocks.

9. The computer system of claim 8, wherein the stream of data blocks is established by a computer program.

10. The computer system of claim 9, wherein a respective round of the cipher is used for each iteration.

\* \* \* \* \*